United States Patent [19]

Becker

[11] Patent Number: 5,200,842
[45] Date of Patent: Apr. 6, 1993

[54] CHARGE-COUPLED DEVICE WITH WIDE DYNAMIC RANGE

[75] Inventor: Alain Becker, Montrouge, France
[73] Assignee: Thomson-CSF, Puteaux, France
[21] Appl. No.: 639,894
[22] Filed: Jan. 11, 1991

[30] Foreign Application Priority Data

Jan. 16, 1990 [FR] France .................................. 90 00429

[51] Int. Cl.⁵ .............................................. H04N 3/14
[52] U.S. Cl. .................................. 358/483; 358/213.26
[58] Field of Search .............. 358/211, 213.11, 213.13, 358/213.19, 213.22, 213.26, 482, 483

[56] References Cited

U.S. PATENT DOCUMENTS

| 4,263,620 | 4/1981 | Felix ..................................... 358/213 |
| 4,680,476 | 7/1987 | Berger et al. ................... 358/213.26 |
| 4,685,117 | 8/1987 | Arques ............................ 358/213.26 |
| 4,760,558 | 7/1988 | Berger et al. ................... 358/213.26 |
| 4,819,072 | 4/1989 | Boucharlat et al. ............ 358/213.26 |
| 4,825,292 | 4/1989 | Knibbe ............................ 358/213.26 |

FOREIGN PATENT DOCUMENTS

| 130295 | 1/1985 | European Pat. Off. . |
| 207826 | 1/1987 | European Pat. Off. . |
| 315778 | 5/1989 | European Pat. Off. . |

*Primary Examiner*—Stephen Brinich
*Attorney, Agent, or Firm*—Oblon, Spivak, McClelland, Maier & Neustadt

[57] ABSTRACT

This device has, on one and the same component: an image zone having a first array of at least one line of cells integrating an electrical charge than can then be transferred from point to point in the array, along the line, up to an end of this line; a memory zone having a second array with a same number of lines of cells and a transfer zone. The line of the second array is a looped line sequenced like the corresponding line of the first array, and at the same rate, and the transfer zone includes charge divider means receiving, at input, said charge transferred from point to point in the first array along the line and dividing said charge into two sub-charges with a pre-determined relative ratio; means to neutralize the first of these sub-charges; and means to add the second of these sub-charges to the charge received at output of the looped line and to reinject the resultant total charge into the input of the looped line so as to make it recirculate therein. The concomitant sequencing of the lines of the first array and of the second array is repeated in a plurality of cycles so as to bring about an increase, by the accumulation of the second successive sub-charges in the looped line, of the corresponding charge of the memory array. Thus, by the resulting second integration, the dynamic range of the charge-coupled device is increased by a proportion corresponding to said pre-determined ratio of the two sub-charges, which is typically 40 dB (thus taking the dynamic range, for example, from 120 to 160 dB) for a ratio of 100:1.

6 Claims, 1 Drawing Sheet

U.S. Patent  Apr. 6, 1993  5,200,842
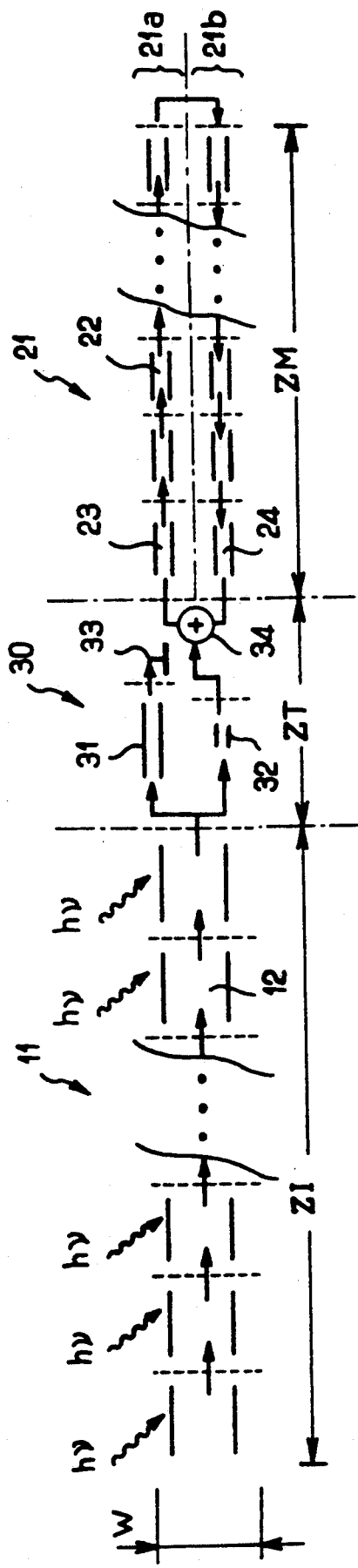
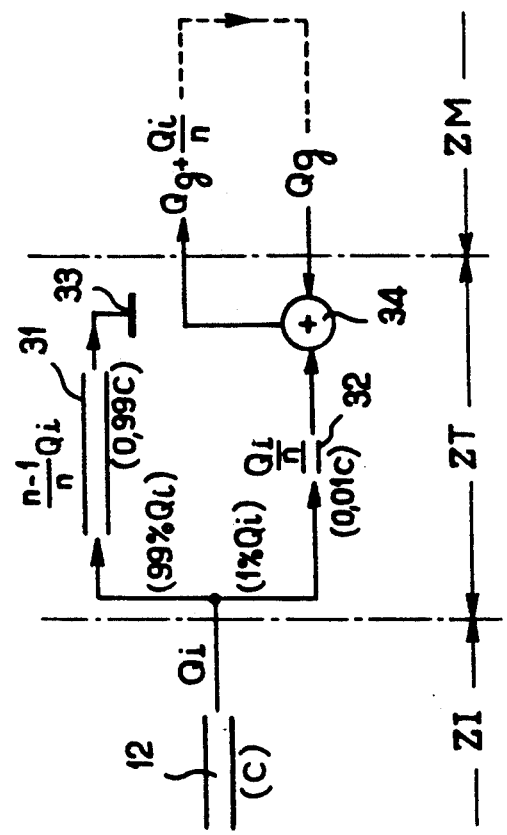
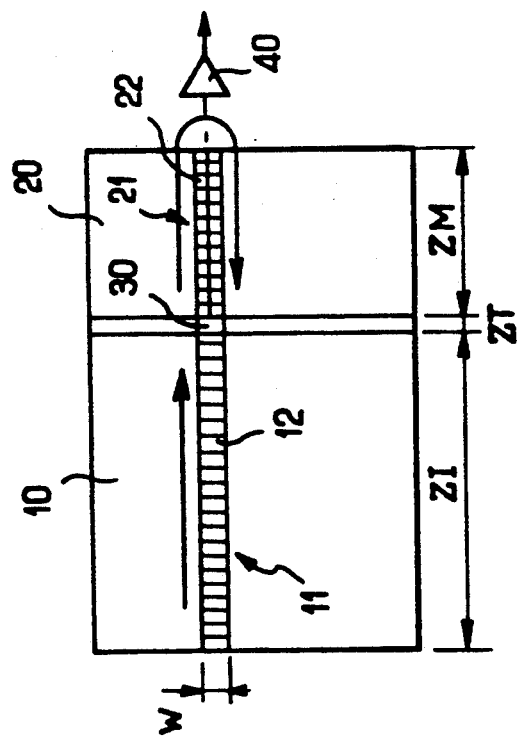

CHARGE-COUPLED DEVICE WITH WIDE DYNAMIC RANGE

BACKGROUND OF THE INVENTION

1. Field of the Invention

The present invention relates to a charge-coupled device (CCD) also known as a CCD array.

More generally, it relates to the detection of a light beam by a CCD array and may be advantageously implemented in all applications capable of using CCD arrays when a substantial illumination time is needed, calling for a wide dynamic range for the component in order to circumvent or limit problems of the saturation of this component.

It can also be implemented in the form of a one-dimensional array (CCD linear array) or two-dimensional array as in the non-restrictive examples that shall be given hereinafter.

2. Description of the Prior Art

It is known, essentially, that that a charge-coupled device picks up an incident light flux at each exposed pixel of the array and converts the corresponding energy into an electrical charge which is stored in an electrical capacitor and gets increased throughout the period of exposure, known as the "integration time".

The resultant charges are then transferred from from one point to the next in the array until they reach a component capable of re-reading each stored charge and converting it into a voltage or current that can be used by the processing circuits placed downline.

The best CCDs available at present, for example those marketed under the brand name of Dynasensor by Dalsa Inc., have a dynamic range of the order of 120 dB. The limits of this dynamic range are essentially dictated by the risk of saturation of each pixel under the effect of an excessively prolonged illumination (the effect of overflow on to the neighboring pixels) and above all of saturation of the electrical reading amplifier of the detection circuit (a dynamic range of 120 dB corresponds to a range of voltage values that may go from 10 nV to 10 V, and this amounts to a considerable voltage difference).

In many applications, however, this 120 dB limit is still insufficient for certain processing operations or for certain measurements that have to be made.

This is the case, for example, when the CCD arrays are used for optical processing of signals, especially in two-dimensional architectures operating in real time by optical means and carrying out the processing (notably correlation and filtering) of signals such a those delivered by radar and or telecommunications receivers.

Indeed, in this exemplary application to the processing of signals, a major part of the dynamic range is lost because it is necessary to integrate not only the useful signal itself, which is to be correlated or filtered, but also the mean component of the correlation pedestal. This mean component will subsequently be eliminated even though its own level is already of the order of 70 dB.

In an application such as this, it would be desirable, for this reason, to be able to have a dynamic range which is notably greater than 120 dB, even if all that can be used is the upper 120 dB of the range, corresponding to the useful dynamic range of the signal after elimination of the pedestal.

To this effect, the dynamic range could be increased through the use of two distinct CCDs: the first one works like a standard CCD and the second one, placed downline with respect to the first one, is not photo-active but is used to carry out a second integration while the basic integration continues in the first component.

This method has, however, two drawbacks that are inherent to it:

First of all, it causes major deterioration in the signal-to-noise ratio, for the use of two separate components necessarily dictates a dual signal conversion (the conversion of the charge into a voltage or a current, to come out of the first CCD array, then the conversion of this voltage or current into a charge, to enter the second CCD array): this entails heavy penalties owing to the noise factor introduced by the active components carrying out these conversions.

Furthermore, this noise is greatly increased by the number of inter-CCD transfers which will be needed to obtain the result.

Secondly, it causes a major increase in the total integration time, owing to the the charge transfer time, which is of the order of one microsecond per sample: this would give a total time of four seconds to achieve a transfer in an array of 2000×2000 pixels.

The basic idea of the invention is to enable a widening of the dynamic range of the presently used arrays by a dual integration with, however, the second integration being done directly in the component, with neither any exit of the signal out of this component nor any transformation of the nature of the information between the start and the end of this dual integration.

For, if it is possible to remain within the component instead of going out of it, no additional noise will be introduced since there is no active component, and the processing will then be constituted solely by arithmetically performed charge-transfer operations.

SUMMARY OF THE INVENTION

The invention proposes a charge-coupled device, made on one and the same component, enabling this goal to be attained.

The basic structure of the component of the invention is the one, known per se, of a component with two separate zones (image zone and memory zone).

More precisely, a known structure such as this includes the following on one and the same component:

an image zone having a first array of at least one line of cells, each formed by a photo-active pixel receiving a light energy and carrying out a first integration of this light energy by the accumulation of a corresponding electrical charge, it being possible for this charge to be then transferred from point to point in the array, along the line, up to an end of this line;

a memory zone having a second array of cells that are not photo-active, the number of lines of this memory zone being homologous with that of the first array, a transfer zone interposed between the image zone and the memory zone, to receive the charges that have accumulated in the cells of the first array and to transfer them towards the second array to store them therein, and reading means to detect the charges stored in the second array and to convert them into an electrical voltage or current signal.

As is well known, the first CCD array (image zone) of the component is photo-active: it integrates the light signal for a given time until the result reaches a fraction of the saturation level, said fraction depending on the quality sought and, at the end of each integration, it transfers its content to the second CCD (memory zone).

However, a standard array such as this only transfers its data from the image zone towards the memory zone. Besides, this transfer is done at a fast rate so as to the reduce the latency time of the processing to the minimum.

The second array is re-read at a slower rate during a new cycle of integration of the first array, to restore the stored information. It is then no longer possible, after the transfer, to continue to integrate the initial optical signal.

Unlike these prior art arrays, the invention essentially propose to keep the charge in the memory zone during a large number of integration cycles of the image zone, and to make this charge grow, from transfer to transfer, by the addition, to the charge already present in the memory zone, of a fraction of the charge that is stored in the image zone and has just been transferred.

It is thus possible the increase the dynamic range of the CCD array by the fraction of charge used in the transfer.

More precisely, to this effect, the present invention proposes a charge-coupled device wherein, for said line (in the case of a one-dimensional array) or for each of said lines (in the case of a two-dimensional array):

the line of the second array is a looped line sequenced at the same time as the corresponding line of the first array, and at the same rate, said line of the second array including an input and an output, so that it can receive, at this output, the charges introduced at input and transferred from point to point up to the output, and the transfer zone includes:

charge divider means receiving, at input, said charge transferred from point to point in the first array along the line and dividing said charge into two sub-charges with a pre-determined relative ratio;

means to neutralize the first of these sub-charges, and means to add the second of these sub-charges to the charge received at output of the looped line and to reinject the resultant total charge into the input of the looped line so as to make it recirculate therein.

The concomitant sequencing of the lines of the first array and of the second array is then repeated in a plurality of cycles so as to bring about an increase, by the accumulation of the second successive sub-charges in the looped line, of the corresponding charge of the memory array and thus, by the second integration that results therefrom, to increase the dynamic range of the charge-coupled device by a proportion corresponding to said pre-determined ratio of the two sub-charges.

The charge divider means are standard devices per se, known to those skilled in the art, and they can be made equally well in the form of a capacitive divider or in the form of an electrical divider (with a controlled potential barrier).

This is also the case for the charge neutralizing means and for the charge adder means.

The pre-determined ratio of the two sub-charges is advantageously of the order of 100:1. This makes it possible to obtain a corresponding increase of 40 dB in the dynamic range.

Preferably, the looped line is made on the component in the form of a folded line constituted by two adjacent halves that have the same length and transfer the charges in opposite directions.

The cells of the folded looped line then advantageously have a width that is approximately half that of the cells of the line of the first array, so that the homologous lines of each of the arrays have respective widths that are substantially identical.

We shall now describe an example of the implementation of the invention with reference to the appended drawing.

BRIEF DESCRIPTION OF THE DRAWINGS

In the drawings:

FIG. 1 shows a schematic view of a CCD component according to the invention, with its two arrays formed by an image zone and a memory zone, these two zones being separated by a transfer zone.

FIG. 2 shows a detail of FIG. 1, corresponding to an isolated horizontal line of the component of FIG. 1, with these very same zones.

FIG. 3 is an explanatory diagram showing the way in which the division and accumulation of the charges takes place in the transfer zone.

In FIG. 1, the reference 10 designates the array of the image zone ZI of a CCD component with two separate image and memory zones, the reference 20 designating the array of the memory zone ZM.

These two arrays are interconnected by a transfer zone ZT, the structure and working of which, described further below, are characteristic of the invention.

The content of the memory zone ZM could be read by means of a detection amplifier 40 which will convert the charges stored in the memory zone into electrical voltage or current signals. This aspect of the component is a standard one per se and shall therefore not be explained in detail. However, it will be pointed out that it is possible to use every known reading method, i.e. chiefly the simultaneous reading, in parallel, of all the lines of the array (with, in this case, as many amplifiers 40 as there are lines) or the successive reading of the different lines, each being transferred in sequence into the buffer register formed by a shift register having the same number of pixels as each of the lines of the memory zone and connected, in this case, to a single detection amplifier 40.

We shall now give a more detailed explanation of the structure of each of the lines of the component with reference to FIG. 2 (if necessary, the component may have only one line, in the case of a CCD linear array).

In FIG. 2, lines of dots and dashes are used to show the different potential barriers between the cells of the component. The means used to achieve coordinated control of these different potential barriers, which are standard means per se, have not been shown for clarity's sake.

Line 11 of the image zone ZI has a standard structure, with a series of cells 12 each corresponding to a photo-active pixel receiving an elementary light energy hv and converting it into an electrical charge which will increase as and when the illumination increases (through the phenomenon of integration of the light flux).

At the end of the integration, the charges that have accumulated in each of the pixels will be transferred, from point to point, up to the transfer zone ZT by appropriate control, according to a precise and coordinated sequencing, of the potential barriers between each of the pixels. This point-to-point transfer of charges by control of the potential barriers between the different pixels or cells is characteristic of all the charge-coupled devices and shall therefore not be described in detail.

The line 21 of the array constituting the memory zone ZM is also standard and has a plurality of cells 22, the number of which is equal to the number of cells 12 of the image zone. These cells 22 are separated from one another by potential barriers, the control of which, by means of appropriate control signals, enables the charges to be shifted along the line, from the first cell 23 to the last cell 24.

However, this line 21 of the memory zone has original features as compared with a standard component:

first of all, it is looped, i.e. it will be possible to achieve not only a shift but also a recirculation of the charges in the line through the reinjection of the charge of the last cell 24 towards the first cell 23 of the line, this reinjection being done during the shifting of the charges by means of an element 34 which shall be described further below;

secondly, the line 21 is made in folded form, i.e. it is made in the form of two parallel and contiguous half lines 21a and 21b, with the charges circulating in each half line in reverse direction so as to bring the first cell 23 to the vicinity of the last cell 24.

In this case, it is advantageous for the width (the physical dimension in the direction perpendicular to that of the line, namely in the vertical direction according to the conventions of the figure) of the cells 22 of the memory zone ZM to be approximately half that of the cells 12 of the image zone ZI, so that the width W of the set of two lines placed end to end is substantially constant, thus enabling the surface area occupied by the substrate to be optimized.

It will be noted that this second characteristic (folded line), unlike the first characteristic (looped line), is not indispensable to the implementation of the invention; there could be provision for a line 21 that is not folded, with a return link enabling the charge to be brought back from the last cell (which would then be at the far right of the component according to the conventions of the figure) towards the transfer zone, located in the central part of the component.

This long return link would, however, be costly, both in technological terms (the design of the component would be made more complicated) and in electrical terms (owing to the losses introduced by this transfer).

We shall now explain the structure and working of the means 30 of the transfer zone ZT which provides, firstly, in a manner known per se, for the transfer of the charges from the image zone ZI to the memory zone ZM and secondly, in a manner characteristic of the invention: (a) for the recirculation of the charges stored in the memory zone and (b) for the processing enabling the performance, on these charges, of the second integration by which the desired widening of the dynamic range is obtained.

These transfer means 30 essentially include means to divide the charge Qi transferred from the last cell 12 (the one shown in FIG. 3) of the image zone ZI by dividing it into two sub-charges according to a predetermined division ratio n which, in the example illustrated, is 100:1.

It is possible, notably, to use capacitive divider means formed by two capacitors 31 and 32, wherein the sum of the capacitance values of these two capacitors is equal to the capacitance C of the cell 12, and wherein the ratio of the capacitance values of these two capacitors is equal to the desired division ratio n. Thus, for a division ratio n=100, the capacitor 31 will have a capacitance of 0.99 C and the capacitor 32 will have a capacitance of 0.01 C. As a result, a charge with a value $(1-1/n)Qi$, namely 0.99 Qi will be found on the capacitor 31, and a charge with a value of Qi/n, namely 0.01 Qi will be found on the capacitor 32.

The charge at the capacitor 31, which is unused, will be neutralized to prevent an accumulation of charge during successive cycles. The procedure adopted will be to conduct this charge towards a charge destruction cell, symbolized by the reference 33.

By contrast, the charge at the capacitor 32 will be added to the charge Qg already present in the cell of the line of the memory array corresponding to the pixels in question by means of a charge adder 34, the resultant charge Qg+Qi/n being reinjected into the line of the array of the memory zone at the next cycle, in place of Qg, in order to make it recirculate therein.

It will be noted that it is not necessary to use capacitive charge divider and adder means but, instead of these capacitive means, it is also possible to use electrical means carrying out (in a manner known per se) a division by means of a controlled electrical field (potential barrier). It is also possible to obtain the desired effect by means of a discharge of the capacitance into a resistor during a controlled period (until Qi/n is obtained).

The factor of division n will be chosen so that the charge that has accumulated at the end of the final integration time (which is itself dependent on the number of recirculation cycles in the memory zone) reaches a level that is generally below the saturation level of the array.

We shall now describe the way in which the sequencing of the transfer takes place.

At the instant t of the integration, we will have:

$$t = k.T1 + (K-1).Tt, \text{ with } 0 < 1 < T2$$

k being the order number of the last integration performed (k being between 1 and a maximum value that corresponds to the planned number of integration cycles, for example 100 cycles);

T1 being the duration of each of the integrations of the image zone;

Tt being the time of transfer from the image zone towards the memory zone through the transfer zone, and T2 being the total integration time, overlapping the two integrations made respectively and concomitantly in the image zone and in the memory zone.

At the instant t, the pixel i will have integrated a charge Qi.

At the next elementary clock cycle, the charge will be transferred in parallel to the two capacitors 31 and 32.

At the start of the next elementary clock cycle, the two capacitors are separated, the capacitor 32 then preserving the charge Qi/n.

During this very same elementary clock cycle, the charge Qi/n is added to the charge Qg already contained in the last cell of the memory zone, and obtained by the prior transfers, and this charge is reinjected into the input of this very same line of the memory zone, the charge Qg thus becoming Qg+Qi/n.

This operation is done successively for each of the lines (there may be, for example, 2000 pixels per line) in continuing the two concomitant integrations for the number of cycles desired, for example one hundred integration cycles.

At the instant t=T2 after the last transfer from the image zone, the integration is stopped.

Then, the charge contained in the memory zone is read, and it is converted into a voltage or a current.

It will be noted that the transfer from the image zone towards the memory zone calls for two elementary clock cycles, while the charge transfers between adjacent cells of the array call for only one of them.

Hence, to make the sequencing of the component keep its synchronous character, a clock will be provided for the control of the transfer of the charges in the transfer zone. This clock will be twice as fast as the one used for the charge transfers in the image zone and in the memory zone.

The dual integration has the effect of giving a total dynamic range which is the sum of the dynamic range of the CCD array of the image zone and the charge fraction used by the array of the memory zone. With a division factor n of 100:1 (obtained, for example, through a capacitor 32 with a capacitance of 1 pF and a capacitor 31 with a capacitance of 99 pF), a gain of 40 dB is obtained by the second integration, giving a processing dynamic range of 120+40=160 dB, with a component that has little difference with regard to the prior art components in its dimensions and its sequencing.

It will be noted, however, that owing to the limitation of the CCD components, the dynamic range at output remains equal to 120 dB in this example, but that these 120 dB are placed at the top of the 160 dB of the total dynamic range of the internal processing.

The following are the chief advantages of the invention:

since the signal never leaves the component between the beginning and the end of the integration, the result keeps all its integrity;

since the structural differences between this component and presently used components are small, the performance values are increased without any appreciable extra cost, whereas a dual integration using two distinct CCD components would entail a major burden on overall costs;

the signal-to-noise ratio is excellent because the noise is introduced only once (during the final reading, at the end of the total integration time T2) and at only one place (at the output of the component).

Since the structure and the advantages of the invention are totally independent of the nature of the signal that is integrated, the CCD array with wide dynamic range, according to the invention, is valuable in all applications calling for an extended illumination time and a wide dynamic range of integration.

This is the case, notably:

in all applications for the imaging of scenes with low luminosity or low contrast (in television, astronomy, facsimile communications etc.);

in applications for signal processing by optical means, using charge transfers (integration, filtering etc.) typically for correlation processing operations calling for the management of the mean value of a signal; in certain cases (notably in filtering), the coefficient of division n may be related to the coefficients of the filtering equation.

What is claimed is:

1. A charge-coupled device having, on one and the same component:

an image zone having a first array of at least one line of cells, each formed by a photo-active pixel receiving a light energy and carrying out a first integration of this light energy by the accumulation of a corresponding electrical charge, means for transferring this charge from point to point in the array, along the line, up to an end of this line;

a memory zone having a second array of cells that are not photo-active, the number of lines of this memory zone being homologous with that of the first array, a transfer zone interposed between the image zone and the memory zone, to receive the charges that have accumulated in the cells of the first array and to transfer them towards the second array to store them therein, and reading means to detect the charges stored in the second array and to convert them into an electrical voltage or current signal;

wherein, for each line or for each of said lines:

the line of the second array is looped line sequenced at the same time as the corresponding line of the first array, and at the same rate, said line of the second array including an input and an output so that it can receive, at said output, the charges introduced at input and transferred from point to point up to the output, and the transfer zone includes:

charge divider means receiving, at input, said charge transferred from point to point in the first array along the line and dividing said charge into two sub-charges with a predetermined relative ratio;

means to neutralize the first of these sub-charges, and means to add the second of these sub-charges to the charge received at output of the looped line and to re-inject the resultant total charge into the input of the looped line so as to make it recirculate therein;

the concomitant sequencing of the lines of the first array and of the second array being repeated in a plurality of cycles so as to bring about an increase, by the accumulation of the, second successive sub-charges in the looped line, of the corresponding charge of the memory array and thus, by the second integration that results therefrom, to increase the dynamic range of the charge-coupled device by a proportion corresponding to said predetermined ratio of the two sub-charges.

2. The charge-coupled device of claim 1, wherein said charge divider means are capacitive divider means.

3. The charge-coupled device of claim 1, wherein said charge divider means comprises a capacitive divider.

4. The charge-coupled device of claim 1, wherein said pre-determined ratio of the two sub-charges is of the order of 100:1 so as to obtain a corresponding increase of 40 dB in the dynamic range.

5. The charge-coupled device of claim 1, wherein said looped line is made on the component in the form of a folded line constituted by two adjacent halves that have the same length and transfer the charges in opposite directions.

6. The charge-coupled device of claim 5, wherein the cells of the folded looped line have a width that is approximately half that of the cells of the line of the first array, so that the homologous lines of each of the arrays have respective widths that are substantially identical.

* * * * *